Feb. 26, 1963   C. E. COMPTON   3,079,208
COOKING APPARATUS

Original Filed Feb. 12, 1957   3 Sheets-Sheet 1

INVENTOR.
CHARLES E. COMPTON
BY Hooper, Leonard & Buell
his ATTORNEYS.

Feb. 26, 1963  C. E. COMPTON  3,079,208
COOKING APPARATUS
Original Filed Feb. 12, 1957  3 Sheets-Sheet 2

INVENTOR.
CHARLES E. COMPTON
BY Hoopes, Leonard & Buell
his ATTORNEYS

Feb. 26, 1963  C. E. COMPTON  3,079,208
COOKING APPARATUS
Original Filed Feb. 12, 1957  3 Sheets-Sheet 3

INVENTOR.
CHARLES E. COMPTON
BY Hoopes, Leonard & Buell
his ATTORNEYS

United States Patent Office 3,079,208
Patented Feb. 26, 1963

3,079,208
COOKING APPARATUS
Charles Edward Compton, Bridgeport, W. Va.
(P.O. Box 1946, Clarksburg, W. Va.)
Original application Feb. 12, 1957, Ser. No. 639,652, now Patent No. 2,946,275, dated July 26, 1960. Divided and this application Mar. 9, 1959, Ser. No. 798,210
2 Claims. (Cl. 312—315)

This invention relates to cooking apparatus and particularly to cooking apparatus of the so-called "charcoal broiler" type in which food is supported in proximity to a mass of glowing charcoal or similar heat source for broiling. This application is a division of my copending application Serial No. 639,652, filed February 12, 1957, now Patent No. 2,946,275, issued July 26, 1960.

I have devised cooking apparatus of the above mentioned type which is exemplified by the apparatus shown in the accompanying drawings as a portable unit adaptable for both indoor and outdoor use which is light in weight, low in cost and easily transportable and adapted to be carried in the trunk of an automobile on picnics and other outings.

I prefer to provide for orienting the food being cooked generally vertically in position beside or in horizontal relation to the heat source or heating means rather than there-above and so that the horizontal distance between the food being cooked and the heat source is easily and rapidly adjustable. Various charcoal broilers have heretofore been proposed in which the food being broiled is oriented generally vertically, and provision has been made for altering the horizontal distance between the food and the mass of glowing charcoal. I have improved on cooking apparatus of that type by providing extremely simple, light weight, inexpensive cooking apparatus in which both the food being cooked and the heating means may easily be inserted and removed and relatively shifted. Among other things I provide a novel holder for use in cooking apparatus, novel features of the holder being applicable to both a holder for a mass of glowing charcoal or similar heat source, which may be termed broadly "heating means," and the food holding means. Additional features of novelty and utility inhere in the food holding means. Still further features of novelty and utility are incorporated in the unit generally, the means for supporting the holders and the means for closing openings in the unit for draft control, certain of such means also providing for cooking atop the mass of glowing charcoal or maintaining warm food which has previously been cooked. Provision is made for making two cooking units out of my cooking apparatus. Thus there are a substantial number of improvement features in my cooking apparatus. Certain of such improvement features are claimed in my above mentioned copending or parent application.

I provide cooking apparatus comprising means forming an open-topped chamber, means for supporting at least largely within the chamber heating means and food holding means, a generally horizontal guideway at the top of the chamber and closure means operable in the guideway for closing the opening in the top of the chamber to a desired extent. The closure means are preferably in pan form to receive food to be cooked or kept warm by the heating means in the chamber. Desirably the closure means may comprise two pans adapted collectively to close the opening in the top of the chamber when disposed in operative position.

I further provide cooking apparatus comprising means forming a chamber having an opening, a projection extending generally inwardly of the chamber at an edge of the opening, a closure member for the opening having an edge adjacent said edge of the opening and having an extension projecting generally inwardly of the chamber and curving about the first mentioned extension serving in the nature of a hinge to mount the closure member for movement between open end closed positions. I preferably also provide additional guide means extending between the first mentioned means and the closure members guiding the closure member in an arcuate path upon movement between open and closed positions.

Other details, objects and advantages of the invention will become apparent as the following description of a present preferred embodiment thereof proceeds.

In the accompanying drawings I have shown a present preferred embodiment of the invention in which FIGURE 1 is a perspective view of cooking apparatus;

Referring now more particularly to the drawings, there is shown cooking apparatus comprising a cooking unit A and a supporting unit B. The two units are entirely separate and may be handled individually, being light in weight (preferably made largely of light weight stainless steel) and desirably of such size that they may be carried side by side in the trunk of an automobile, but when the apparatus is to be used for cooking the unit A is desirably mounted upon the unit B. Such mounting makes the cooking apparatus readily portable as the unit B is provided with casters 2 upon which the apparatus may be rolled about from one place to another. Also the mounting of the unit A atop the unit B positions the unit A at the proper elevation for convenient cooking.

Figure 1:
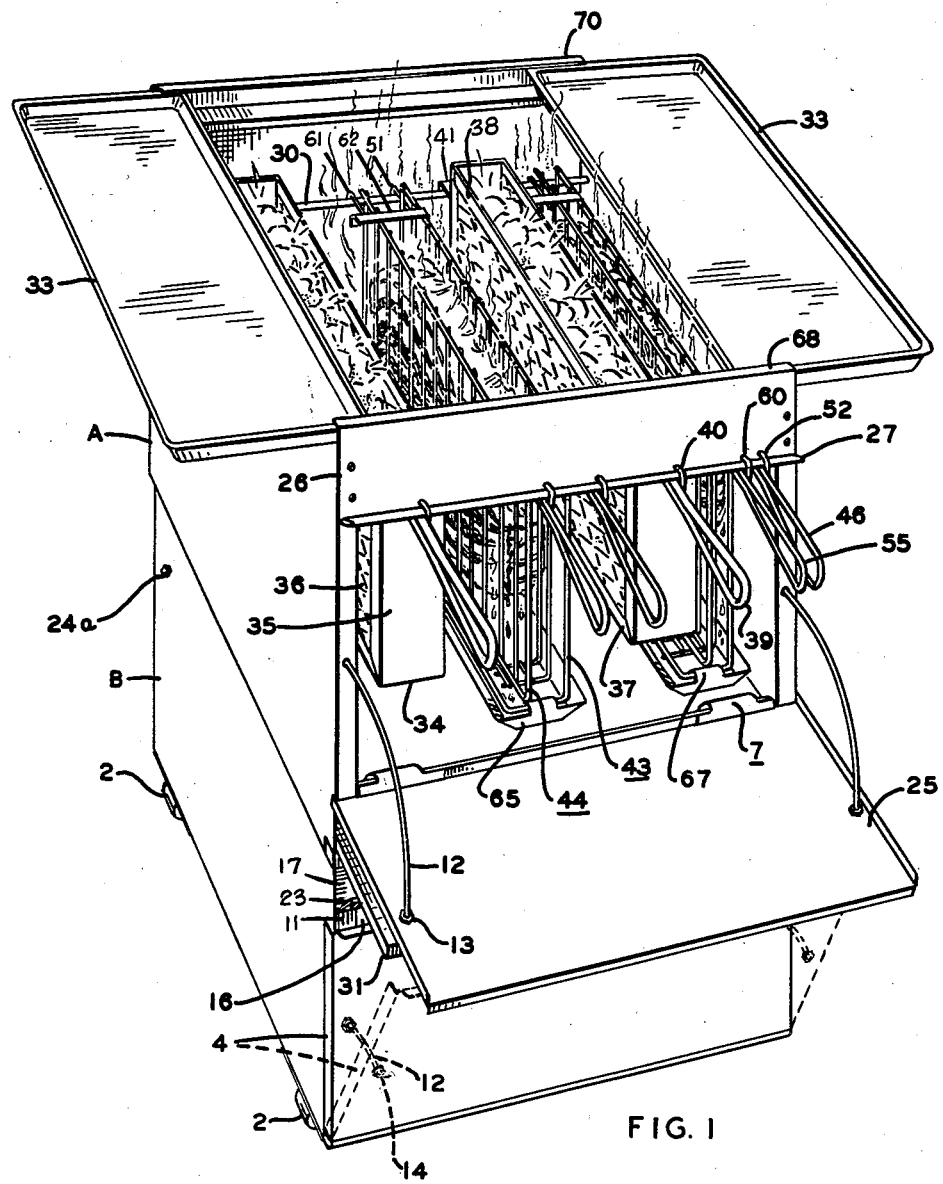
Figure 5:
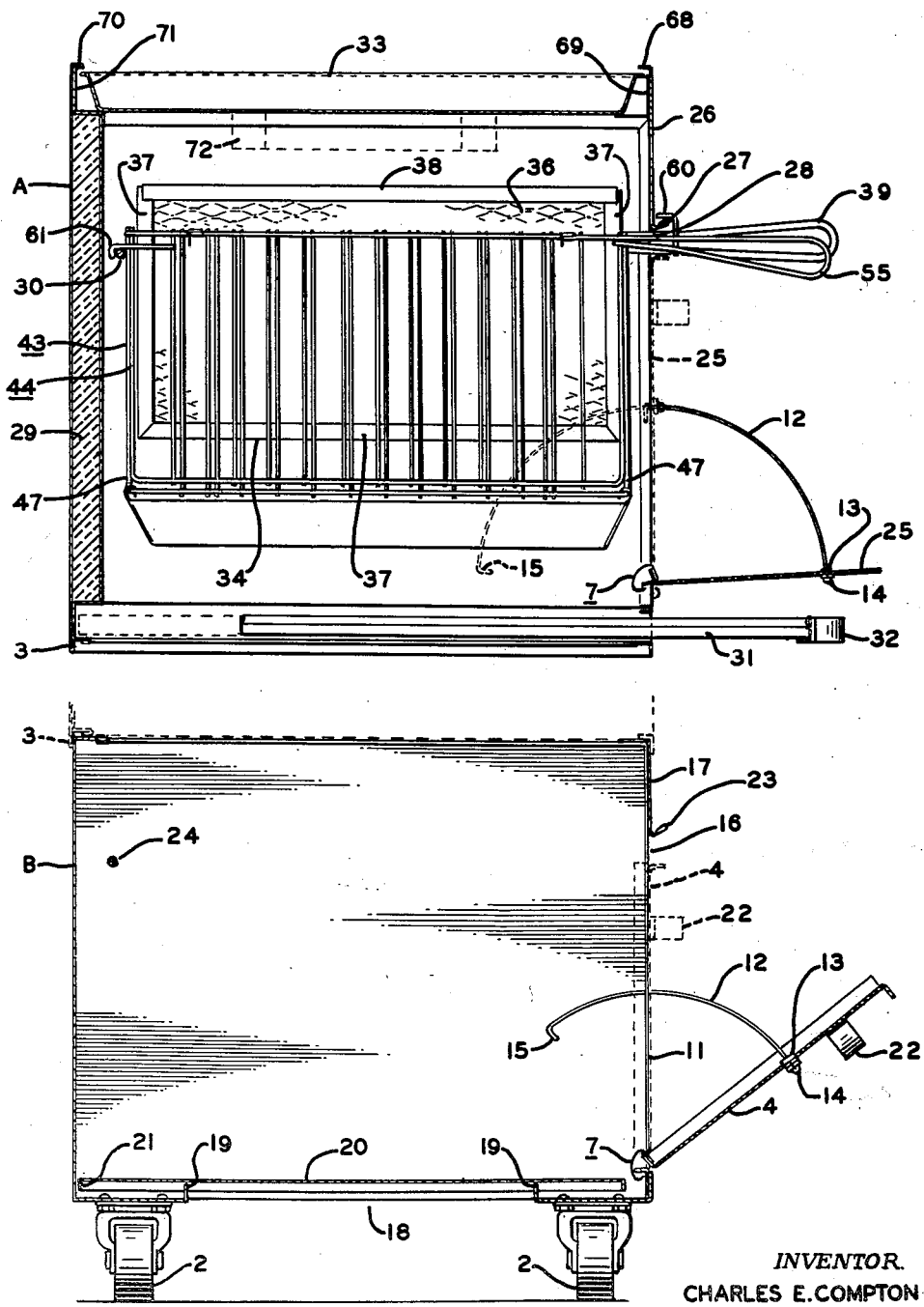
FIGURE 5 is an exploded vertical cross sectional view through the cooking apparatus.

Each of the units A and B is of generally cubical shape and is hollow. The unit A has at its bottom a peripheral flange 3 adapted when it is set down on the unit B to surround the upper periphery of the unit B to position the unit A on the unit B. The unit B is closed at the sides and back and open at the top. It has a front opening which is adapted to be largely closed by a door 4. The door 4 is movable between open and closed positions about a novel connection with the body of the unit B. The door 4 is shown in FIGURE 5 in partially open position in solid lines and in closed position in dotted lines. In FIGURE 1 it is shown in closed position in solid lines and in partially open position in dotted lines.

Figure 3:
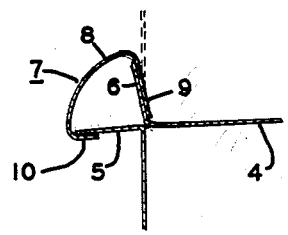
FIGURE 3 is a fragmentary cross sectional view of a portion of the apparatus showing the mounting of a door, the door being in open position.
Figure 4:
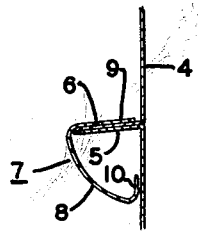
FIGURE 4 is a view similar to FIGURE 3 but showing the door in closed position.

The connection between the door 4 and the body of the unit B is shown in FIGURE 5 and to larger scale in FIGURES 3 and 4. At the bottom of the door opening the unit B has a generally inwardly projecting flange 5. The bottom of the door has a flange 6 which when the door is closed seats atop the flange 5 as shown in FIGURE 4. Connected with the flange 6, as, for example, by spot welding, is a guide member designated generally by reference numeral 7. The guide member 7 comprises an arcuate body 8 terminating at one end in a relatively long flange 9 and terminating at the other end in a relatively short flange 10. The guide member 7 is preferably connected with the flange 6 by spot welding through the flanges 9 and 6. Thus the guide member 7 becomes to all intents and purposes an integral part of the door 4. When the door is being opened the extremity of the flange 5 cooperates with the concave face of the arcuate body 8 of the guide member 7 to restrain the door against outward movement. Portions of the door lie opposite the front flanges 11 of the side walls of the unit B whereby the door is held against inward movement. The extent to which the door may be opened is limited by the flange 10 which engages against the under face of the flange 5 as shown in FIGURE 3.

Connected with the door 4 adjacent each lateral edge thereof is a curved rod 12. Each of the curved rods 12 is rigidly fastened to the door, as by inner and outer nuts 13 and 14 threaded onto the end of the rod and drawn up tightly against the inner and outer surfaces respectively of the door. The outer nuts 14 are shown as cap nuts. Each rod 12 is formed in the shape of a circle arc and has a foot 15 at its inner end. Each rod 12 passes through an opening of such size as to snugly but slidably receive it in the front flange 11 of the corresponding side wall of the unit B. The rods 12 constitute additional guide means extending between the body of the unit B and the door 4 guiding the door in an arcuate or generally pivotal path when moving between open and closed positions. The feet 15 of the rods 12 limit the extent to which the door 4 may open as they engage the inner faces of the front flanges 11 of the side walls of the unit B. Thus both the feet 15 and the flange 10 limit the extent of opening of the door and the parts are preferably so designed that the feet 15 and the flange 10 will become operative at the same time to limit the opening of the door.

The guide member 7 may extend along any desired part of the bottom of the door or a plurality of such guide members spaced apart along the bottom of the door may be employed. In either case the door is guided for quasi-pivotal movement between open and closed positions as described above. The connection of the door to the body of the unit B is especially adaptable for utilization in a heat zone as heat will not adversely affect the connection. No pintle or close fitting bearing is utilized and there is no part requiring lubrication. Moreover the connection is of very low cost as compared with a conventional hinged connection.

The unit B in addition to serving as a support for the unit A also constitutes a container for food, utensils, etc., and in addition may, when the bottom closure of the unit A is open as will presently be described, be utilized to control the draft through the cooking apparatus. The door 4 may substantially completely close the front of the unit B if desired or a small opening 16 may be provided between the top of the door and the bottom of a transverse member 17 extending across the front of the unit B adjacent the top thereof. For reasons which will presently appear I prefer to provide the opening 16 as that opening has utility in use of the unit B. An opening 18 is provided in the bottom of the unit B, which opening may extend across the greater portion of the width of the unit B and may be bounded at the front and back by flanges 19. A removable bottom 20 is provided for the unit B which rests upon the flanges 19 and itself has a downwardly extending peripheral flange 21. This construction is economical and also makes possible removal of the bottom 20 for cleaning. A handle 22 is spot welded to the front of the door 4 for opening and closing the door.

The transverse member 17 has a forwardly projecting flange 23, and a rod 24 is provided in the upper portion of the unit B adjacent the rear thereof for a purpose to be presently described. The flange 23, rod 24 and space 16 cooperate in a manner which will be explained. The rod 24 may extend through the side walls of the unit B and may have cap nuts 24a applied thereto outside the side walls.

The unit A is closed at the sides and back and open at the top. It has a front opening which is adapted to be largely closed by a door 25. The door 25 is movable between open and closed positions about a connection which may be the same as the connection above described between the door 4 and the body of the unit B. The unit A has at its upper portion across the front a member 26 having at its bottom an outwardly projecting flange 27 spaced above the top of the door 25 when closed to provide an opening 28 analogous to the opening 16. The door 25 is shown fully open in solid lines in FIGURES 1 and 5 and closed in dotted lines in FIGURE 5.

The sides and back of the unit A are of double thickness sheet metal, preferably stainless steel, with insulating material 29 therein. A rod 30 extends across the unit A near the top thereof and adjacent the back wall and may be applied in the same way as the rod 24 is applied to the unit B as explained above. The rod 30, the flange 27 and the opening 28 of unit A correspond in position and function to the rod 24, flange 23 and opening 16 of unit B and in each case are for the purpose of supporting holders presently to be described. The holders are in two categories, food holders and fuel holders which are otherwise referred to herein as heating means. The holders are adapted to be supported either by the rod 30 and the flange 27 with their handles projecting through the opening 28 or by the rod 24 and the flange 23 with their handles projecting through the opening 16. When the holders are supported in the unit A it is ordinarily for the purpose of cooking and when they are supported in the unit B it is ordinarily for the purpose of storage although the unit B may be used for keeping warm in one or more food holders food which has been cooked in the unit A, or, indeed, cooking may be performed in unit B just as in unit A if desired. In that case the bottom 20 would probably be removed from the unit B and provision made for draft extending up from the top of unit B through unit A by opening the closure 31 at the bottom of unit A. The closure 31 is in the form of a slidable drawer having a handle 32 and acts to catch any ashes from the heating means in unit A. If cooking is to be done in unit B while unit A is disposed atop unit B the bottom closure 31 of unit A will probably be removed entirely, as will the bottom 20, and the draft may be controlled by the doors 4 and 25 and by the pans 33 presently to be described. Indeed unit B alone can be used for cooking even without unit A or the units may be placed side by side on a suitable support and cooking may be done simultaneously in both of them. Cooking may be done simultaneously in both units when unit A is disposed atop unit B by following the directions given above.

There may be any desired number of fuel holders and any desired number of holders for food to be cooked. One fuel holder and one food holder will be described. The fuel holder may consist of a generally vertically arranged metal basket for containing a mass of glowing charcoal or other fuel. The basket may have a solid bottom 34, solid ends 35 and foraminous sides 36. The bottom and ends of the fuel holder are shown as being made of steel of sufficient gauge to have the requisite strength, each thereof being of channel cross section with flanges 37 facing inwardly. The sides are shown as being made of expanded steel and a generally U-shaped top member 38 extends along the top of each side, embracing the top and also embracing the upper ends of the corresponding flanges of the ends 35. The bottom, ends, sides and top members are all welded together to form a strong fuel holder or basket having openings at the sides and top for draft.

The fuel holder has a handle 39 which may consist of a generally U-shaped steel rod the ends of which pass through openings in the front end of the fuel holder and are peened over inside and also welded to the front end of the fuel holder. Welded to the handle is a hook 40 which extends upwardly from the handle and then toward the body of the fuel holder as shown in the drawings so that the hook 40 is open in a generally horizontal direction toward the body of the fuel holder. Welded to the rear end of the fuel holder (the end opposite the end to which the handle is attached) is a bracket 41 having at its outer extremity a downwardly projecting flange 42. The bracket 42 in effect constitutes a hook which is open downwardly.

When the fuel holder or heating means is to be introduced into the chamber of the unit A it is held in the hand by the handle 39 with the handle generally horizontal but with the rear end of the fuel holder (the end to which the bracket 41 is applied) slightly uptilted, and with the door 25 open the fuel holder is introduced through the front of the unit A by generally horizontal movement into position with the bracket 41 above the rod 30 until the hook 40 receives the flange 27. Then the rear end of the fuel holder is lowered until the bracket 41 rests upon the rod 30. Thus the fuel holder is easily insertable into the unit A into position in which it is held suspended or hung by means of the hook 40 and the bracket 41 upon the flange 27 and the rod 30. The fuel holder may be moved laterally or along the flange 27 and rod 30 without disturbing its support upon that flange and rod. When the fuel holder is to be removed from the unit A it is slightly tilted to raise the rear end thereof until the flange 42 of the bracket 41 rises above the level of the rod 30 whereupon the fuel holder is drawn out through the front of the unit, disengaging the hook 40 from the flange 27. The fuel holder may be similarly introduced into and removed from the unit B wherein it is supported by the flange 23 and the rod 24. When the fuel holder is in place in the unit A its handle 39 projects out through the opening 28 and while when it is in place in the unit B its handle projects out through the opening 16. The door 25 of the unit A and the door 4 of the unit B may be closed with a fuel holder in place in the corresponding unit thus effectively closing the front of the unit except for the comparatively narrow opening 28 or 16 as the case may be.

A food holder comprises opposed generally upright side members 43 and 44. The side member 43 comprises a top rod 45 formed as a handle 46 at its outer end and downwardly extending end members 47 each having a horizontally turned foot 48 at its bottom, the feet 48 being connected by a longitudinal rod 49. A series of L-shaped members 50 are welded at their upper ends to the top rod 45 and at the extremities of their feet to the longitudinal rod 49. Adjacent each end of the side member 43 a series of short rods 51 are provided which are parallel to the rod 49 and welded between two adjacent rods 50 to form positioning means for a purpose to be presently described. Welded to the handle 46 is a hook 52 analogous to the hook 40 above described and for the same purpose. Welded to the side member 43 adjacent its rear end is a bracket 53 analogous to the bracket 41 and for the same purpose.

The side member 44 comprises a top rod 54 formed as a handle 55 at its outer end and downwardly extending end members 56 each joined at their bottoms by a longitudinal rod 57. Adjacent each end of the side member 44 one of the rods 50 projects downwardly beyond the rod 44 and has a foot 59 forming a hook adapted to engage with one of the rods 51 or the rod 49 of the side member 43 as may be appropriate for the thickness of the food to be cooked. Welded to the handle 55 is a hook 60 analogous to the hooks 40 and 52 above described and for the same purpose. Welded to the side member 44 adjacent its rear end is a bracket 61 analogous to the brackets 41 and 53 and for the same purpose.

Figure 2:
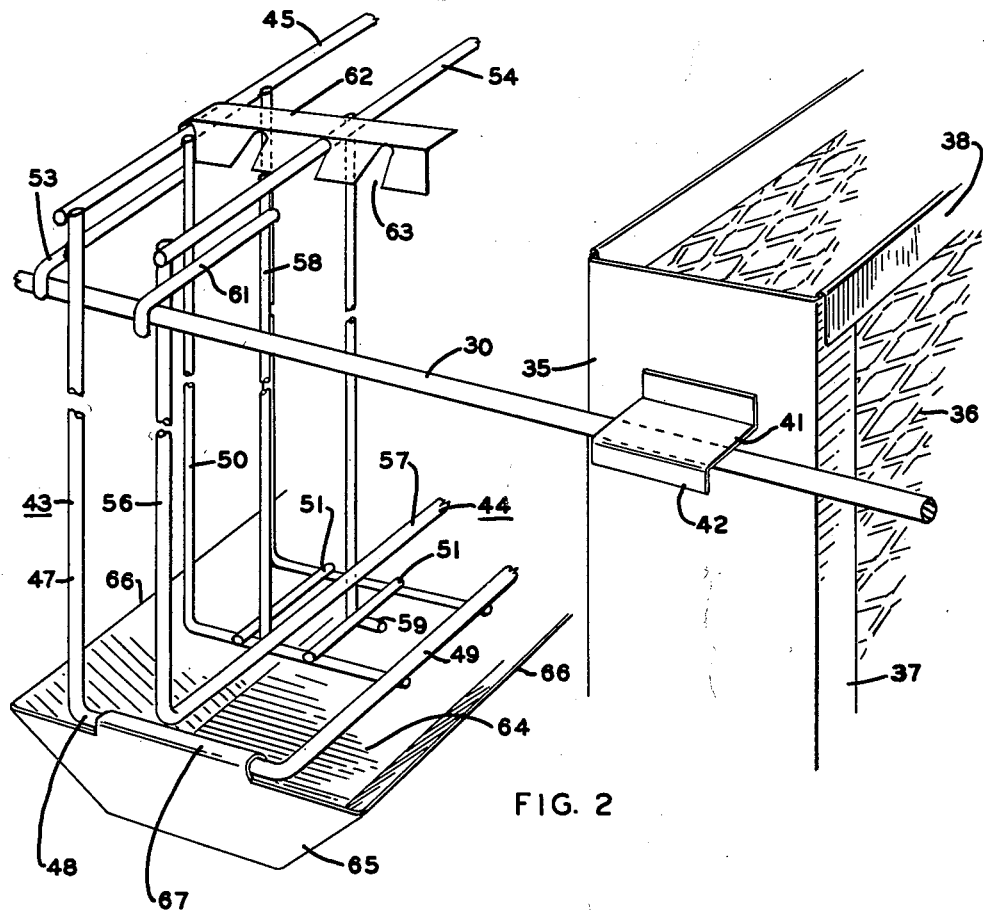
FIGURE 2 is an enlarged fragmentary perspective view of a portion of the cooking apparatus shown in FIGURE 1.

As above indicated the hooks 59 are engaged with a selected one of the rods 51 or 49 depending upon the thickness of the food to be cooked so that the food is maintained properly in position between the side members 43 and 44 during cooking. If, for example, a steak is to be broiled and the steak is relatively thin the feet 59 will be engaged behind the left-hand rod 51 viewing FIGURE 2. If the steak is of medium thickness the hooks 59 will be engaged behind the right-hand rod 51 as shown in FIGURE 2. If the steak is very thick the hooks 59 will be engaged behind the rod 49. The steak or other food to be cooked preferably does not project above the tops of the side members 43 and 44. Pivoted to the top rod 45 of the side member 43 adjacent the respective ends of the side member 43 are latch members 62 each having a plurality of slots 63 to receive the top rod 54 of the side member 44, the one of the slots 63 receiving the top rod 54 depending upon the thickness of the steak or other food to be cooked.

I provide a drip pan adapted to be carried by the food holder at the lower portion thereof to receive drippings from food being cooked in the food holder, the drip pan in effect forming a unit with the food holder so as to be removable from and returnable to the cooking chamber with the food holder. The drip pan is made of suitable metal and is long and narrow, having a bottom 64, ends 65 and sides 66. The ends and sides are preferably inclined upwardly and outwardly away from the bottom as shown in the drawings. Each end of the drip pan carries an inwardly facing hook 67 whereby the drip pan is adapted to be mounted on the feet 48 of the end members 47 of the side member 43 as shown. The drip pan may be removed by relative lateral movement between it and the side member 43 accompanied by a slight relative tilting. The drip pan remains firmly in place in use of the cooking apparatus and catches the drippings from the food being cooked. The drip pan carried by the food holder is of great advantage in that substantially all drippings are received by the drip pan and a general cleaning up of the cooking apparatus due to uncontrolled drippings from the food being cooked as is required with conventional apparatus is not necessary.

The front member 26 extends above the tops of the side walls of the unit A and is inwardly turned or flanged at its upper extremity at 68 as shown. An angle member 69 is welded atop the unit A generally under the flange 68 to provide cooperatively with the flange an inwardly facing guiding channel. At the back of the unit A is a flange 70 opposite to the flange 68, and an angle member 71 analogous to the angle member 69 and similarly positioned is also provided. The flange 70 and angle member 71 form a guiding channel facing toward the guiding channel formed by the flange 68 and the angle member 69. In the structure shown in the drawings the angle member 71 is shown as being integral with the back wall of the unit A while the angle member 69 is shown as being separate from the member 26. The angle members 69 and 71 and the flanges 68 and 70 form together a track to receive slidable closure means for the top of unit A. While such closure means may take various forms I have shown them as in the form of two pans 33 (FIGURE 1). The pans may be slid along the tracks to substantially fully close the unit A at the top, or they may be variously positioned to provide for a desired draft. The pans are shown in FIGURE 1 at substantially their extreme outer positions providing for full draft through the unit A. The pans may be completely removed if desired. In addition to being closure members they may be used for keeping warm food which has been cooked or indeed for cooking food directly over the heating means. Food may be cooked at the same time within the unit A as shown in FIGURE 1 and also in the pans 33 when positioned over the heating means.

At each side of the unit A adjacent the top thereof is a handle 72, the handles being provided to facilitate handling of unit A. Similar handles may be provided for unit B if desired although not shown in the drawings.

While I have shown and described a present preferred embodiment of the invention it is to be distinctly understood that the invention is not limited thereto but may be otherwise variously embodied within the scope of the following claims.

I claim:

1. A container comprising means forming a chamber having an opening, a projection extending generally horizontally inwardly of the chamber at an edge of the opening, a closure member for the opening having an edge adjacent said edge of the opening and having an extension projecting generally inwardly of the chamber and curving about the projection serving in the nature of a hinge without a hinge pin or pintle to mount the closure member for movement between open and closed positions, the end of the extension being hook-shaped to engage the projection and bearing upwardly against the under face of the projection when the closure member is in open position whereby the extension by its engagement with the projection alone limits opening movement of the closure member.

2. A container comprising means forming a chamber having an opening, a projection extending generally horizontally inwardly of the chamber at an edge of the opening, a closure member for the opening having an edge adjacent said edge of the opening and having an extension projecting generally inwardly of the chamber and curving about the projection serving in the nature of a hinge without a hinge pin or pintle to mount the closure member for movement between open and closed positions, the end of the extension being hook-shaped to engage the projection and bearing upwardly against the under face of the projection when the closure member is in open position whereby the extension by its engagement with the projection alone limits opening movement of the closure member, and additional guide means extending between the first mentioned means and the closure member guiding the closure member in an arcuate path upon movement between open and closed positions.

References Cited in the file of this patent

UNITED STATES PATENTS

| | | |
|---|---|---|
| 1,064,388 | Scruggs | June 10, 1913 |
| 2,409,528 | Baunach | Oct. 15, 1946 |
| 2,561,358 | Gipple | July 24, 1951 |
| 2,727,505 | Hood | Dec. 20, 1955 |
| 2,812,415 | Markowitz | Nov. 5, 1957 |
| 2,885,724 | Anderson | May 12, 1959 |
| 2,946,275 | Compton | July 26, 1960 |

FOREIGN PATENTS

| | | |
|---|---|---|
| 135,974 | Australia | Dec. 27, 1933 |